United States Patent [19]

Engström

[11] Patent Number: 5,826,614
[45] Date of Patent: Oct. 27, 1998

[54] DEVICE FOR AUTOMATIC CLOSING OF CUT-OFF THROTTLE AT HOSE REELS

[75] Inventor: Hans Thorbjörn Engström, Helsingborg, Sweden

[73] Assignee: AB. Ph. Nederman & Co., Helsingborg, Sweden

[21] Appl. No.: 776,696

[22] PCT Filed: Jul. 24, 1995

[86] PCT No.: PCT/SE95/00883

§ 371 Date: Feb. 3, 1997

§ 102(e) Date: Feb. 3, 1997

[87] PCT Pub. No.: WO96/05001

PCT Pub. Date: Feb. 22, 1996

[30] Foreign Application Priority Data

Aug. 11, 1994 [SE] Sweden .................................. 9402681

[51] Int. Cl.⁶ .................................................. B65H 75/34
[52] U.S. Cl. .............................. 137/355.19; 137/355.27
[58] Field of Search ..................... 137/355.18, 355.19, 137/355.27

[56] References Cited

U.S. PATENT DOCUMENTS

| Re. 18,016 | 3/1931 | Woodford | 137/355.19 |
|---|---|---|---|
| 176,337 | 4/1876 | Neracher | 137/355.19 |
| 659,996 | 10/1900 | Young | 137/355.19 |
| 720,228 | 2/1903 | Couch | 137/355.19 |
| 2,519,064 | 8/1950 | Palm | 137/355.19 |
| 4,315,522 | 2/1982 | Brown | 137/355.27 |
| 4,649,954 | 3/1987 | Dunwoody | 137/355.17 |

FOREIGN PATENT DOCUMENTS

| 3407549 | 12/1984 | Germany . |
|---|---|---|
| 501050 | 10/1994 | Sweden . |

Primary Examiner—A. Michael Chambers
Attorney, Agent, or Firm—Tarolli, Sundheim, Covell, Tummino & Szabo

[57] ABSTRACT

An apparatus for extracting gases comprises a rotatable reeling drum, a suction hose, a cut-off throttle, a position changing device, and a pivoting means. The position changing device cooperates with the pivoting means to open the cut-off throttle during initial rotation of the reeling drum in a direction of unwinding the suction hose and close the cut-off throttle within a first revolution of the reeling drum in a direction of winding the suction hose.

15 Claims, 6 Drawing Sheets

DEVICE FOR AUTOMATIC CLOSING OF CUT-OFF THROTTLE AT HOSE REELS

The present invention relates to a device for automatic closing of cut-off throttle at hose reels including a rotatable reeling or wind-up drum with at least one suction hose for extracting or sucking-out contaminated gases, whereby one or preferably several hose reels are provided at an extracting system, whereby each hose reel cooperates with a cut-off throttle which is intended to completely or partially close the through-flow of gas from the suction hose to the extracting system, whereby the cut-off throttle is provided to close said through-flow of gas completely or partially when the suction hose is completely or partially wound up on the reeling drum or for opening said through-flow of gas completely or partially when the suction hose is completely or partially unwound from the reeling drum and whereby a throttle pivoting or rotating means is provided to pivot or rotate the cut-off throttle to said completely or partially open position or completely or partially closed position.

At devices of the abovementioned type the suction hoses are connected to suction systems for generating a negative pressure in the suction hoses and thereby suck contaminated gases into and through said hoses. Several hose reels are often connected to one and same extracting or exhausting system, which means that gases are sucked into the suction hoses of the various hose reels whether they are used of not, whereby large volumes of air are unnecessarily extracted.

This problem has been eliminated by providing a cut-off throttle at each hose reel and by closing this cut-off throttle at the hose reel which is not used.

Various devices for automatic closing of cut-off throttles at hose reels with suction hoses are known from SE,A, 8303147-6 and SE,A,9103188-0. These prior art devices however, are rather expensive and unreliable and they require a transmitter/receiver or switch, which means that they must be connected to a source of current.

The object of the present invention is to provide at devices of the abovementioned type a substantially less complex and less sensitive construction which requires no circuitry. For this purpose, said device has the characterizing features of subsequent claim 1.

Since the position changing device is mounted on or at the reeling or wind-up drum so that it cooperates with the throttle pivoting means one or more times per revolution of the wind-up drum and changes position of the throttle pivoting means when the direction of rotation of the wind-up drum is reversed, the device becomes simple, reliable and easy to maintain.

The invention will be further described below with reference to the accompanying drawings, wherein FIG. 1 schematically illustrates an extracting system to which three hose reels are connected, whereby at each hose reel there is provided a cut-off throttle with a device according to the invention;

Figure 7:
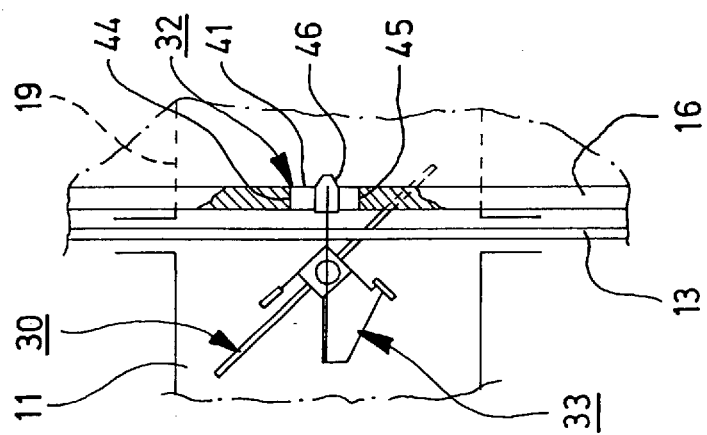
Figure 6:
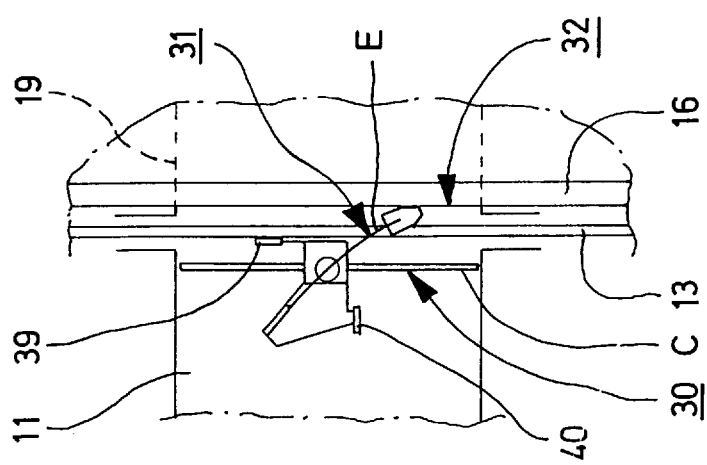
FIG. 6 illustrates the same parts as in FIG. 5, whereby the cut-off throttle is set in closed position.
Figure 5:
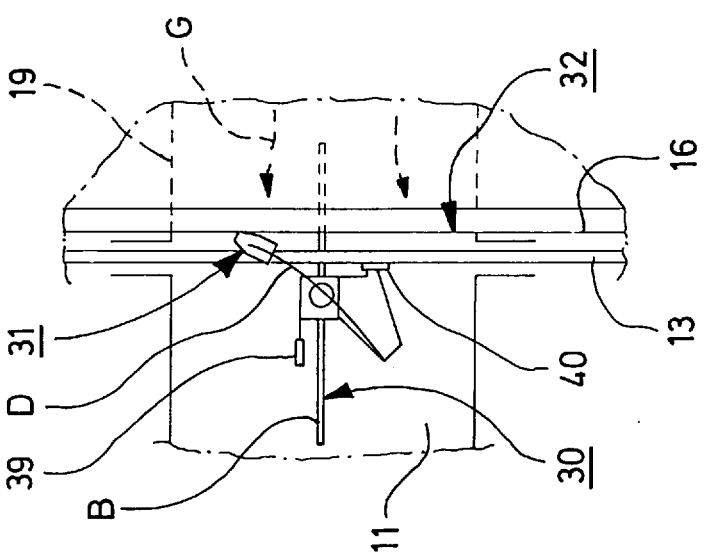
FIG. 5 illustrates parts of a hose reel according to preceding figures, whereby the cut-off throttle by means of the device according to the invention is set in open position.
Figure 8:
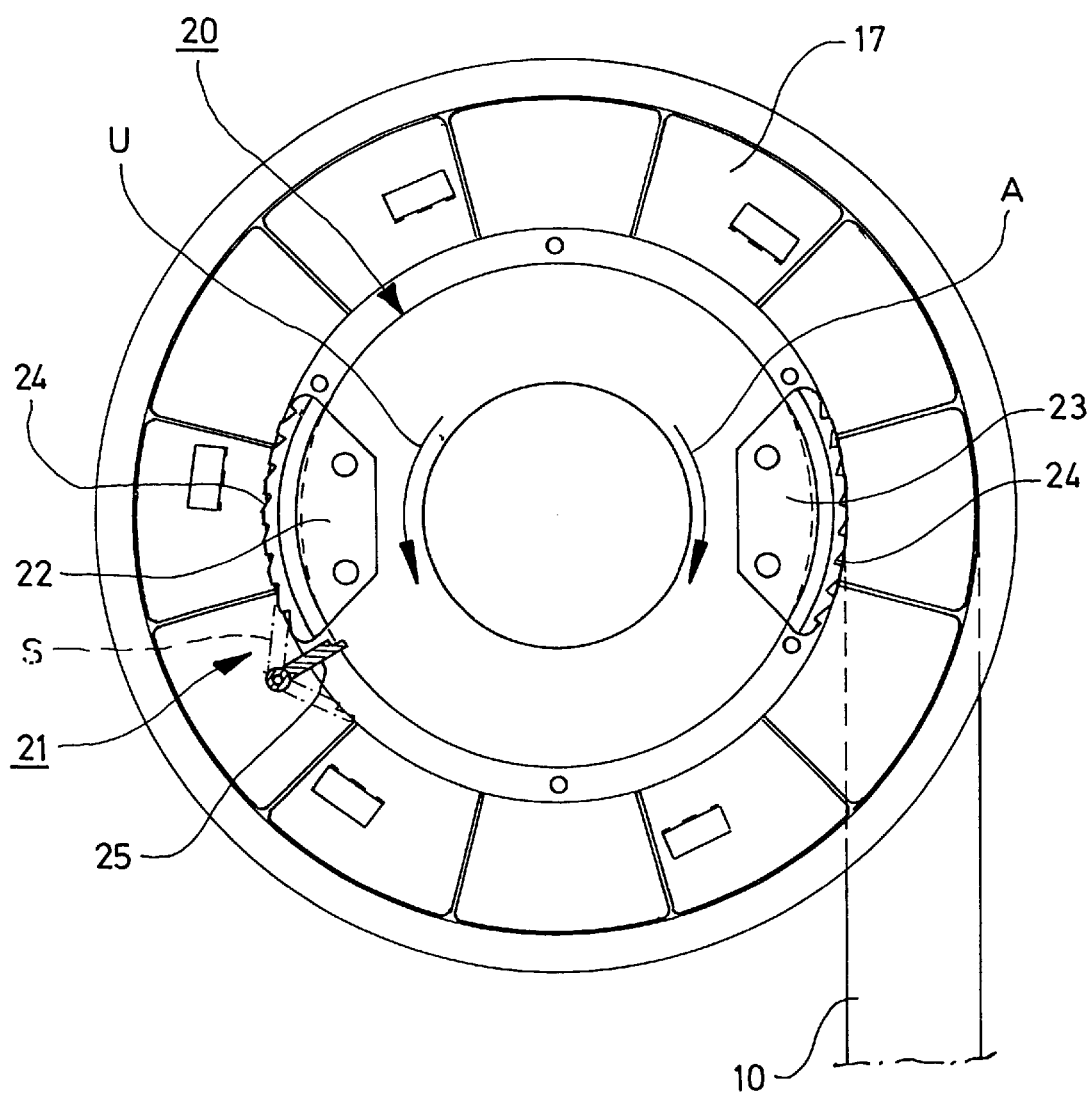

FIG. 7 illustrates the same parts as in FIGS. 5 and 6, whereby the cut-off throttle is set in an intermediate position while the device according to the invention is brought to change position; and FIG. 8 is a plan view of a gable-end side of the hose reel according to the preceding figures, whereby said gable-end side has blocking or retaining means which can cooperate with a ratchet located on a stand.

Figure 1:
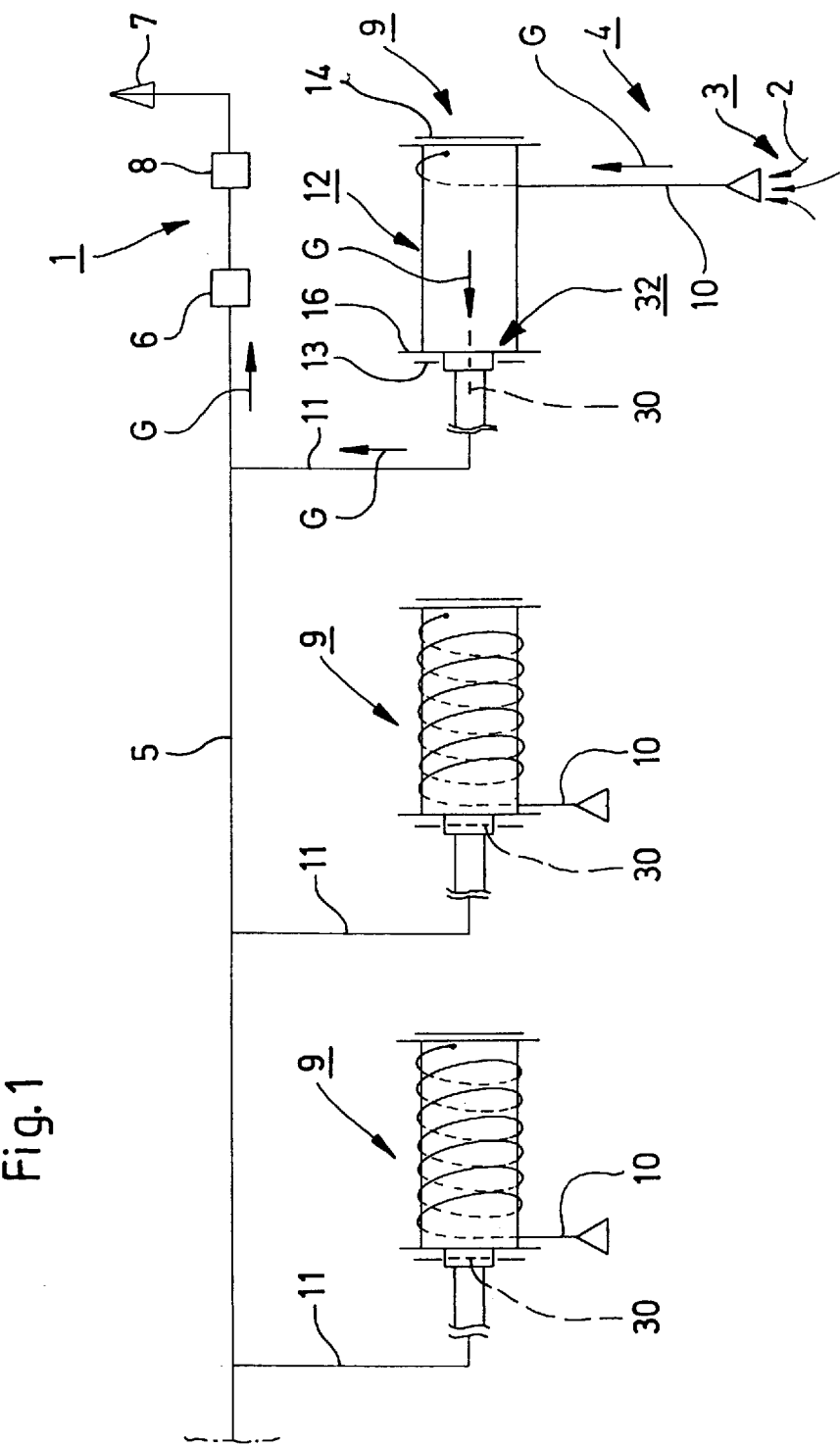

The exhausting or extracting system 1 schematically illustrated in FIG. 1 is adapted to remove contaminated gases 2 which are generated at different locations, preferably working places 3, in premises 4, so that these gases do not force out and contaminate the air therein. The working places 3 can be used for welding, whereby unhealthy welding smoke is generated which may not be inhaled by the personnel but instead sucked out or extracted. The working places however, can also be places where other types of work are carried through or where unhealthy gases are generated for other reasons than as the result of a particular work effort.

The extracting system 1 e.g. includes a pipe line 5 with a filter device 6 for filtering the contaminated gases before they are discharged through a gas discharge 7. The extracting system 1 further includes a fan device 8 which is adapted for generating a negative pressure in the pipe line 5 for sucking out or extract gas therethrough and blow it—after cleaning in the filter device 6—through the gas discharge 7.

Along the pipe line 5 of the extracting system 1 there is provided a number of hose reels 9—e.g. three hose reels 9—with suction hoses 10 which communicate with the pipe line 5 through suction conduits 11.

Figure 2:
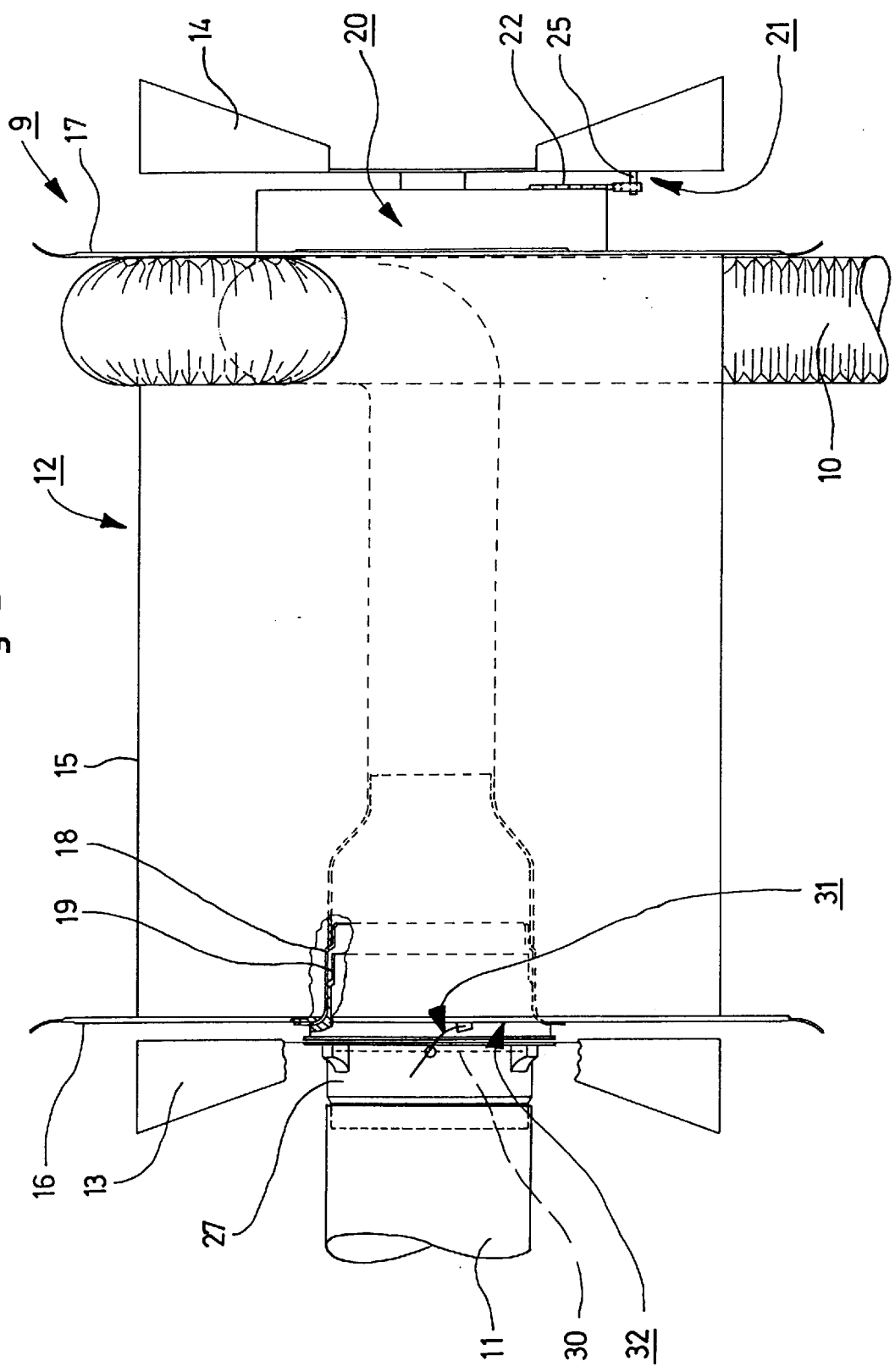
FIG. 2 is a plan view of one of the hose reels of FIG. 1.
Figure 3:
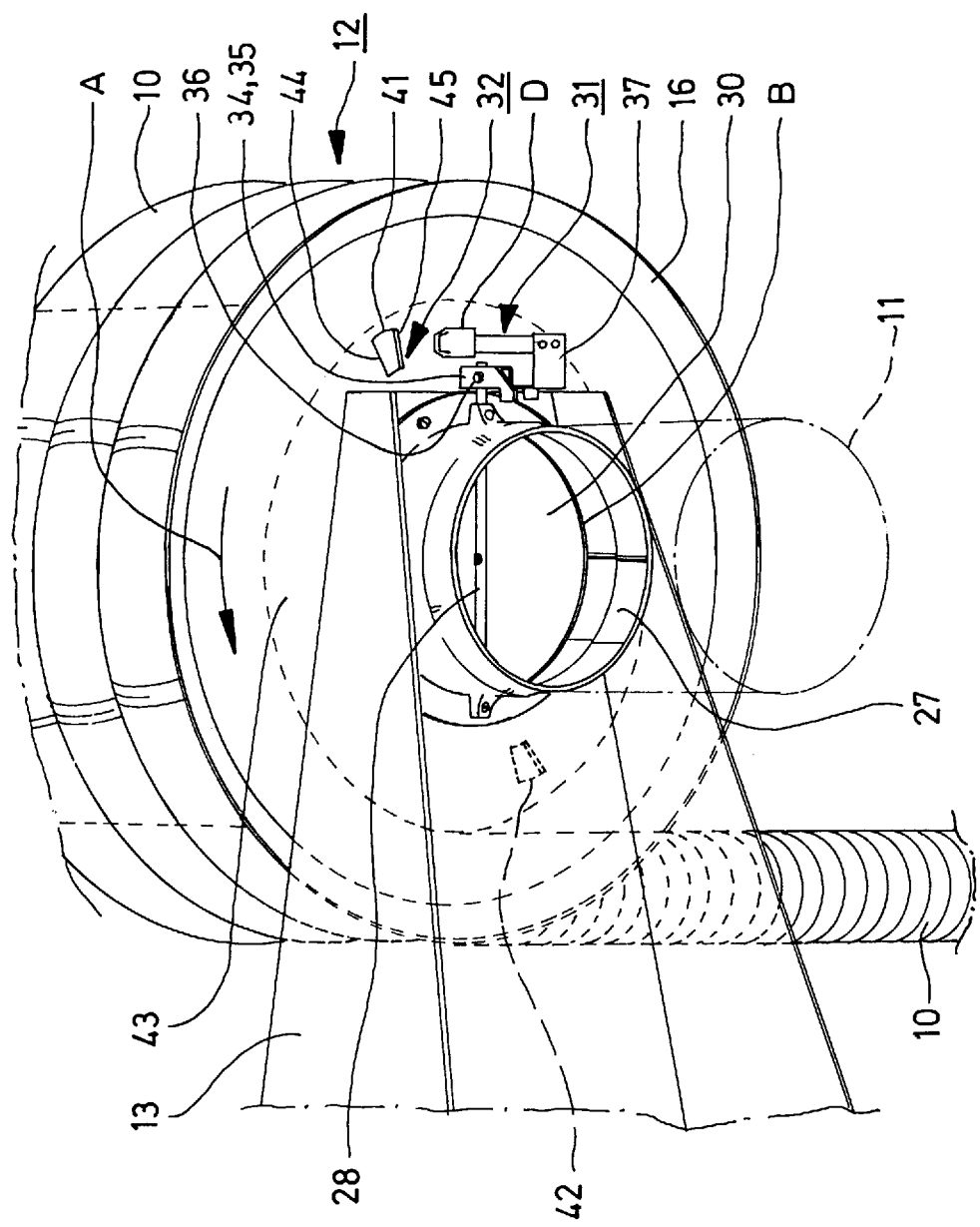
FIG. 3 is a perspective view of a part of the hose reel and a part of a stand therefore as well as the device according to the invention, whereby the cut-off throttle is set in an open position.
Figure 4:
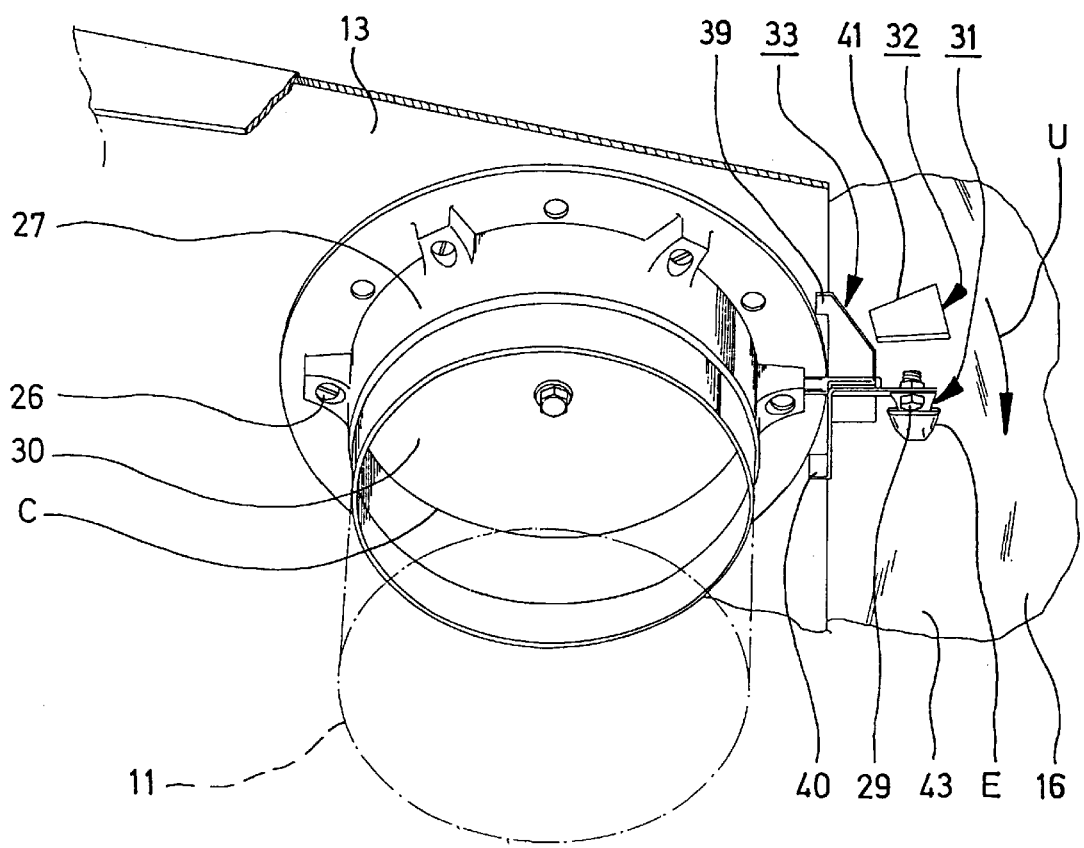
FIG. 4 is a perspective view of a part of the gable-end of the hose reel and a part of a stand for the hose reel as well as the device according to the invention, whereby the cut-off throttle is set in a closing position.

Each hose reel 9 includes a wind-up or reeling drum 12 which is rotatably mounted in the stand of which the side members 13 and 14 are shown in FIG. 2. The stand may be located on a wall in the premises 4 somewhat under the pipe line 5. The reeling drum 12 has a cylindrical part or member 15 with two gable-ends 16 and 17 which are fixedly connected with the cylindrical member so that they rotate together therewith. In the cylindrical member 15 there is provided an opening through which the suction hose 10 or a hose connected thereto passes into said member. The suction hose 10 or the hose connected thereto is inside the cylindrical member 15 connected to a pipe piece 18 which is mounted on a gable-end 16. This pipe piece 18 is rotatably mounted on a second pipe piece 19 which is fixedly mounted on a side member 13 of the stand so that the reeling drum 12 is rotatably mounted relative to said side member 13 while at the same time the suction hose 10 communicates with the suction conduit 11 through the pipe pieces 18, 19.

On the other gable-end 17 of the reeling drum 12 there is mounted a spring device 20 which is adapted to be stretched by rotating the reeling or wind-up drum 12 in the unrolling or unwinding direction A when one pulls the suction hose 10 so that it is unwound. In stretched condition, the spring device 20 affects the wind-up drum 12 to rotate in the wind-up direction U to reel or wind-up the suction hose 10 after unwinding.

Spring devices 20 with the abovementioned function are well known and are therefore not further described or shown here.

A rotation stopping device 21 is provided for locking the reeling drum 12 in different positions at differently far drawn-out suction hose 10. This rotation stopping device 21 can include two blocking or retaining means 22 and 23 which are mounted on the gable-end 17 and have inclined teeth 24. The rotation stopping device 21 may further include a ratchet 25, which is pivotally mounted on the stand member 14 so that it can not engage the inclined teeth 24 of the blocking means 22, 23 when the wind-up drum 12 rotates in the unwinding direction A, but once when the suction hose 10 has been drawn out to a suitable length. Hereby, the ratchet 25 will take a blocking position S shown with dashed and dotted lines in FIG. 8 and thereby stop the rotation of the wind-up drum 12 in the wind-up direction U.

Said rotation stopping device 21 can once again be loosened for releasing the wind-up drum 12 for further rotation thereof in the wind-up direction U by means of the spring device 20.

Rotation stopping devices 21 with the abovementioned function are well known and therefore not further described or shown here.

A pipe member 27 is by means of screws 26 mounted on the side member 13, communicates with the suction hose 10 as well as the suction conduit 11 and can form part of the suction conduit 11 or attachment for said suction conduit. In the pipe member 27 there is pivotally mounted a pivot axis 28 onto which a cut-off throttle 30 is mounted through screws 29. This cut-off throttle 30 can be set in an open position B, wherein the pipe member 27 is completely or partially open so that contaminated gases 2 can flow through said pipe member 27 from the suction hose 10 to the suction conduit 11 and further into the pipe line 5, i.e. so that through-flow of gas G can occur from the suction hose 10 to the extracting system 1.

The cut-off throttle 30 can also be set in a closing position C, wherein it completely or partially closes the pipe member 27 and thereby completely or partially prevents gases from passing through the pipe member 27 and thus, through the suction hose 10 to the suction conduit 11 and the pipe line 5, i.e. so that the through-flow of gas G from the suction hose 10 to the extracting system 1 is completely or partially prevented.

For automatic pivoting of the cut-off throttle 30 from open position B to closing position C and vice versa depending on whether the suction hose 10 is used or not, i.e. is completely or partially unwound or completely or partially reeled or wound up, there is provided a throttle pivoting or rotating means 31 which cooperates with a position changing device 32. This device is mounted on the gable-end 16 of the reeling or wind-up drum 12 so that it at a change of the direction of rotation of said wind-up drum 12 from the unwinding direction A to the wind-up direction U or vice versa, changes the position of the throttle pivoting means 31 from position D to position E or vice versa, which in turn pivots the cut-off throttle 30 from open position B to closing position C or vice versa.

The throttle pivoting means 31 is preferably mounted on a bracket 33 which in turn is pivotally mounted on the pivot axis 28. The bracket 33 includes two flange portions 34 and 35 which are adapted to lie on opposite sides of the pivot axis 28 and which are adapted to be attached thereto through a bolt 36 which extends through both flange portions 34, 35 and through a portion of the pivot axis 28 located therebetween.

The bracket 33 also includes a flange 37 onto which the throttle pivoting means 31 is screwed and which has two tongues defining stop means 39, 4,0. In order to limit the pivoting movements of the throttle pivoting means 31 and cut-off throttle 30, the stop means 39 engages the side member 13 when the cut-off throttle 30 is in closed position and the stop means 40 engages the side member 13 when said cut-off throttle 30 is in open position B.

The position changing device 32 has two position changing members of which each member preferably consists of an opening 41 and 42 respectively, provided in the gable-end 16, preferably in such parts 43 of said gable-end 16 which, seen axially from the outside towards the gable-end 16, lie between the cylindrical member 15 and the pipe piece 18. Opposite edge portions 44, 45 of each opening 41, 42 define position changing portions which are adapted to be able to change the position of the throttle pivoting means 31. The openings 41, 42 are preferably located on the gable-end 16 so that the angle between said openings is 180° or approximately 180°, but alternatively, they can be located in other ways relative to each other.

The throttle pivoting means 31 has such resilient properties that it in bent condition with pressure engages parts 43 of the gable-end 16, and it is mounted so that it by straightening can spring into each passing opening 41 or 42 during rotation of the wind-up drum 12.

The throttle pivoting means 31 may consist of elastic or resilient material and it may include an outer member 46 with a smooth surface through which it engages the gable-end 16.

During unwinding of the suction hose 10 from the wind-up drum 12 in the unwinding direction A, the throttle pivoting means 31 will be in position D (FIG. 5). When an opening 41 and 42 respectively, passes the throttle pivoting means 31 during rotation of the wind-up drum 12 in said direction A, said throttle pivoting means 31 will spring into the opening 41 and 42 respectively, to some extent and immediately out of it again, whereby the cut-off throttle 30 will perform a corresponding quick and limited pivoting movement, i.e. any adjustment of the cut-off throttle 30 from open position B to closed position C will hereby not occur.

When the suction hose 10 is unwound from the reeling or wind-up drum 12 to a suitable unwinding length, the throttle pivoting means 31 will remain in its position D (FIG. 5).

During subsequent reeling of the suction hose 10 in the reeling or wind-up direction, i.e. during reversion of the direction of rotation, the reeling or wind-up drum 12 will rotate in the opposite direction, i.e. in the reeling or wind-up direction U. When the reeling drum 12 has rotated in this direction U so that an opening 41 or 42 reaches the throttle pivoting means 31, said means will spring into said opening 41 or 42 and thereby leave its position D and straighten from bent to straight shape therein (see FIG. 7). During continued rotation of the wind-up drum 12 in said direction U, the edge portion 44 of said opening 41 or 42 will engage the throttle pivoting means 31 and pivot it to position E (FIG. 6) until the stop means 39 prevents further pivoting or rotation thereof. By the change of position of the throttle pivoting means 31 from position D to position E, the cut-off throttle 30 has pivoted from the open position B (FIG. 5) to closed position C (FIG. 6).

Reversed, the position of the throttle pivoting means 31 is changed from position E to position D when the direction of rotation of the reeling drum 12 thereafter is reversed so that it rotates in the unwinding direction A, whereby the throttle pivoting means 31 will spring into that opening 41 or 42 which first reaches said throttle pivoting means 31 and the edge portion 45 of the opening 41 or 42 will engage the throttle pivoting means 31, whereby said means thus will be forced to change position from E to D.

Since there are two openings 41, 42, the throttle pivoting means 31, and thereby the cut-off throttle 30, will be brought to change position before the wind-up drum 12 has rotated half a revolution after reversion of its direction of rotation.

The openings 41, 42 are arranged relative to the blocking means 22, 23 preferably so that said means can not be blocked by the ratchet 25 when the throttle pivoting means 31 protrudes into one of the openings 41, 42 (as is shown in FIG. 7). Hereby, it is ensured that the wind-up drum 12 can not be set in any stop position when the cut-off throttle 30 is in an intermediate position (as is also shown in FIG. 7).

The invention is not limited to what is shown in the drawings and described above, but may vary within the scope of the following claims. As examples of not described but possible alternatives it can be mentioned that only one hose reel can be connected to the extracting system so that said system can be operative while this only hose reel is "closed" when it is not used such that air can not be sucked or extracted therethrough. The hose reel 9 can be operated by a spring device 20 in the wind-up direction, but alternatively, it can be operated in the wind-up and/or unwinding direction by an electric motor or similar, whereby said motor preferably can not be set in stop position when the cut-off throttle 30 is in intermediate position.

The cut-off throttle 30 is shown as a simple throttle plate, but it can be of another type and it is not absolutely necessary to design it for exact sealing all around and/or to let it cooperate with sealing rings in its closed position, because it normally does not matter if the cut-off throttle also in closed position lets through a certain amount of gas flow. The cut-off throttle 30 can be mounted at another suitable spot than at the stand of the hose reel 9 and the throttle pivoting means 31 as well as the position changing device 32 can be of another type and located in other ways than shown and described. Thus, the throttle pivoting means can be spring loaded instead of being made of resilient material and it can be located directly on the pivot axis 28. The bracket 33 can have another shape and the stop means 39, 40 be provided in other ways.

The position changing device 32 does not need to be mounted directly on the gable-end 16, but may be located on any other part or member of or at the wind-up drum 12, provided that this part or member rotates along with said drum and that it can cooperate with the throttle pivoting means 31. Such a part or member can e.g. be located axially beside the wind-up drum and be pivotally connected therewith, whereby said part or member preferably is located adjacent the side member 13 of the stand. The position changing device 32 may consist of other members or parts than one or more openings 41, 42—it may e.g. consist of flange portions or other members which protrude from the gable-end 16.

Finally, it can be mentioned that the position changing parts 41, 42 can be located relative to each other in a manner which corresponds with the relationship between the two blocking means 22, 23.

I claim:

1. An apparatus for extracting gases comprising:

a hose reel including a rotatable reeling drum;

a suction hose which may be wound on and unwound off said rotatable reeling drum;

a cut-off throttle through which gas flows from said suction hose to an extraction system when the cut-off throttle is in an open position and through which the flow of gas from the suction hose to the extraction system is prevented when the throttle is in a closed position;

a pivoting means to pivot said cut off throttle to the open position and the closed position; and a position changing device mounted to said reeling drum cooperating with said pivoting means to open said cut-off throttle during initial rotation of said reeling drum in a direction of unwinding said suction hose and closing said cut-off throttle within a first revolution of said reeling drum in a direction of winding of said suction hose.

2. The apparatus as defined in claim 1 wherein said reeling drum comprises a rotation stopping device which permits locking of said reeling drum in a stop position when said suction hose is unwound from said reeling drum, said pivoting means cooperating with said position changing device only when said reeling drum is not in said stop position.

3. The apparatus as defined in claim 2 wherein said hose reel comprises a spring device which is tensioned when said reeling drum rotates in a direction of unwinding said suction hose, said spring device in the tensioned condition affecting said reeling drum to rotate in a direction of winding said suction hose; and wherein said rotation stopping device comprises a blocking means and a ratchet device, said ratchet device engaging said blocking means to lock said reeling drum against rotation in the direction of winding said suction hose when said suction hose is unwound, said reeling drum rotating in a direction of winding said suction hose by means of said spring device when said ratchet disengages said blocking means, said throttle pivoting means cooperating with said position changing device only when said ratchet means is not engaging said blocking means to lock said reeling drum.

4. The apparatus as defined in claim 1, wherein said position changing device includes a position changing member which cooperates with said throttle pivoting means during rotation of said reeling drum in a direction of unwinding said suction hose to pivot said cut off throttle from a closed position to an open position and during rotation of said reeling drum in a direction of rewinding said suction hose, said position changing member cooperating with said throttle pivoting means to pivot said cut-off throttle from an open position to a closed position.

5. The apparatus as defined in claim 4 wherein said position changing device includes at least two position changing members cooperating with said throttle pivoting means to pivot said cut-off throttle to an open position approximately half a revolution after rotation of said reeling drum in a direction of unwinding said suction hose and said position changing member cooperating with said pivoting means to pivot said cutoff throttle to a closed position approximately half a revolution after rotation of said reeling drum in a direction of rewinding said suction hose.

6. The apparatus as defined in claim 4, wherein each of said position changing members comprises:

a first position changing portion to pivot said throttle pivoting means in a first direction when said throttle pivoting means is brought in contact with said first position changing portion after rotation of said reeling drum in a first direction; and a second position changing portion opposite said first position changing portion to pivot said throttle pivoting means in a second direction when said throttle pivoting means is brought in contact with said second position changing portion after rotation of said reeling drum in a second direction.

7. The apparatus as defined in claim 6, wherein said position changing member comprises at least one opening having opposite edges defining said first position changing portion and said second position changing portion, said throttle pivoting means being biased into said opening and changing the position of said cut off throttle.

8. The apparatus as defined in claim 7 wherein said throttle pivoting means springs into said opening without imparting a complete pivoting movement to said cut-off throttle, said cut-off throttle being approximately positioned between said open position and said closed position.

9. The apparatus as defined in claim 6 wherein said throttle pivoting means is made of a resilient material which bends when engaging said reeling drum and straightens after springing into said opening.

10. The apparatus as defined in 1, wherein two stop means are provided to limit the pivoting movement of said throttle pivoting means and said cut-off throttle, said stop means cooperating with a side member of a stand on which said reeling drum is rotatably mounted.

11. The apparatus as defined in claim 1 further comprising:
   a pipe piece in fluid communication with said suction hose and a suction conduit; and
   a pivot axis mounted within said pipe piece and to which a bracket and cutoff throttle is mounted, said bracket including a stop means for limiting the pivoting movement of said throttle pivoting means and said cut-off throttle.

12. The apparatus as defined in claim 1 wherein said position changing device is mounted on a member rotating with said reeling drum, said reeling drum is situated adjacent a side member of a stand on which said reeling drum is rotatably mounted and said throttle pivoting means is mounted at said side member.

13. The apparatus as defined in claim 12 wherein said position changing device is mounted on a gable-end of said reeling drum.

14. The apparatus as defined in claim 13 wherein said reeling drum includes a member upon which said suction hose can be wound up and a member on said gable end cooperating with said throttle means, said member of said gable located between said member of said reeling drum and a pipe piece to which said suction hose is attached.

15. The apparatus as defined in claim 1 wherein said position changing device is mounted on a gable-end of said reeling drum which is rotatably mounted on a side member of a stand; and wherein said cut-off throttle is mounted on a pivot axis within a pipe piece, said pipe piece being in fluid communication with said suction hose and said extraction system and mounted to said side member adjacent to said reeling drum.

* * * * *